US00RE35879E

United States Patent [19]

Castelli et al.

[11] E Patent Number: Re. 35,879

[45] Reissued Date of Patent: Aug. 25, 1998

[54] CLEANING METHOD USING BOTH WET AND DRY STEAM, AND APPARATUS ADAPTED THEREFOR

[75] Inventors: Daniel Castelli, North Haven; John Donahue, New Haven; Donald J. Gillette, Guilford; Bedrich Hajek, Clinton, all of Conn.

[73] Assignee: Electrostatic Technology, Inc., Branford, Conn.

[21] Appl. No.: 576,464

[22] Filed: Dec. 21, 1995

(Under 37 CFR 1.47)

Related U.S. Patent Documents

Reissue of:

[64] Patent No.: 5,275,849
Issued: Jan. 4, 1994
Appl. No.: 871,494
Filed: Apr. 21, 1992

U.S. Applications:

[60] Continuation-in-part of Ser. No. 743,098, Aug. 9, 1991, Pat. No. 5,116,636, which is a division of Ser. No. 493,791, Mar. 15, 1990, Pat. No. 5,052,332.

[51] Int. Cl.[6] ..... B05D 1/06; B08B 3/02

[52] U.S. Cl. ..... 427/461; 427/104; 427/315; 427/477; 427/486; 118/72; 118/634; 134/30; 134/72; 34/22

[58] Field of Search ..... 427/104, 315, 427/461, 477, 482, 459; 118/72, 634, DIG. 5; 134/15, 30, 40; 34/218, 219, 222, 224, 225; 156/638.1, 640.1, 642.1, 646.1

[56] References Cited

U.S. PATENT DOCUMENTS

| | | | |
|---|---|---|---|
| 3,660,136 | 5/1972 | Guilbault et al. | 427/459 |
| 3,865,610 | 2/1975 | Goodridge et al. | 117/17 |
| 3,889,015 | 6/1975 | English | 427/21 |
| 3,901,185 | 8/1975 | Goodridge et al. | 118/630 |
| 3,904,346 | 9/1975 | Shaw et al. | 427/29 |
| 3,921,574 | 11/1975 | English | 118/106 |
| 4,391,016 | 7/1983 | Kawamura et al. | 15/302 |
| 4,441,238 | 4/1984 | Hijuelos et al. | 29/33 D |
| 5,051,136 | 9/1991 | Tuominen | 134/15 |
| 5,120,370 | 6/1992 | Mori et al. | 134/22.15 |
| 5,137,581 | 8/1992 | Takahashi | 134/21 |

*Primary Examiner*—Shrive P. Beck
*Assistant Examiner*—Fred J. Parker
*Attorney, Agent, or Firm*—Ira S. Dorman

[57] ABSTRACT

The apparatus, system and method utilize sequential sprays of wet, low-temperature steam, and dry, high-temperature steam to clean the exterior of laminated objects as well as to effect volatilization of liquid contaminates trapped between lamina thereof. Water is injected into the conduit through which the low-temperature steam is delivered, so as to produce a desirable concentration of droplets therein. A conveyor moves the laminated objects along a horizontal path through zones in which they are sprayed by the low temperature and high temperature steam, and then through a zone in which they are electrostatically coated with powder.

24 Claims, 5 Drawing Sheets

CLEANING METHOD USING BOTH WET AND DRY STEAM, AND APPARATUS ADAPTED THEREFOR

Matter enclosed in heavy brackets [ ] appears in the original patent but forms no part of this reissue specification; matter printed in italics indicates the additions made by reissue.

BACKGROUND OF THE INVENTION

This is a continuation-in-part of application Ser. No. 07/743,098, filed Aug. 9, 1991 now U.S. Pat. No. 5,116,636, which is in turn a divisional of application Ser. No. 07/493,791, filed Mar. 15, 1990 now U.S. Pat. No. 5,052,332.

It is common practice to coat workpieces by electrostatically depositing a layer of particulate resinous material upon them, thereafter integrating the particles using thermal fusion or other appropriate means. As shown for example in U.S. Pat. Nos. 3,865,610, issued Feb. 11, 1975, No. 3,889,015, issued Jun. 10, 1975, No. 3,901,185, issued Aug. 26, 1975, and No. 3,921,574, issued Nov. 25, 1975 (all of common assignment herewith), this technique has been utilized for insulating the slots and end surfaces of electric motor armature cores, and it is now widely used for that purpose on an industrial scale.

Armature cores are conventionally manufactured in the form of stacked lamina, punched or otherwise formed from metal plate. Lubricating substances are of course utilized in such metal cutting and forming operations, and as a practical matter some residual lubricant is almost invariably retained on the surfaces of the metal element, despite efforts made to remove it. The presence of such substances will interfere with the production of satisfactory insulating layers, and therefore a degreasing step is normally employed preliminarily to powder coating of the component, carried out in-line with the subsequent deposition and fusion steps.

As presently practiced however, degreasing does not effectively remove matter trapped between the lamina. As a result, residual lubricants and the like will volatilize during the heating that is carried out to effect fusion of the powder deposit, with the consequential off-gassing tending to produce pores and other electrical and physical defects and discontinuities.

It is of course common practice to use steam for removing grease and dirt from machinery, such as vehicle engines and the like. Also, Kawamura et al U.S. Pat. No. 4,391,016 discloses apparatus for degreasing elongated members, such as rod stock, which includes degreasing and predrying chambers; in the latter, steam is utilized to effect predrying.

Chlorinated and fluorinated hydrocarbon solvents, such as trichloroethylene and FREON products, are widely employed for metal degreasing, but such solvents are of course ecologically and environmentally undesirable; their use is therefore subject to serious constraints, imposed to maintain safe and pleasant working conditions and to ensure proper disposal. Because of their particularly noxious character, the vapors of such substances must not be permitted to escape into the atmosphere, and consequently the substances are normally used at relatively low temperatures, to avoid excessively active fuming, and are contained in tanks fitted with condensing coils for confining the vapors. As a result, a relatively complex conveyor system must be employed to permit introduction of the workpieces at a level above the condensing coils, and passage therebelow for degreasing.

SUMMARY OF THE INVENTION

Accordingly, it is a broad object of the present invention to provide a novel system and method by which workpieces, and especially electrical components of laminated construction, can be cleaned and coated in a continuous, in-line operation so as to enable the production of high-quality, pore-free coatings thereupon.

A more specific object of the invention is to provide such a system and method in which lubricants, and other such substances, can be volatilized and thereby expelled from between adjacent lamina of a workpiece during the cleaning phase of operation.

Another more specific object is to provide such a system in which is included a conveyor, operating on a single level, for transporting the parts through the cleaning and coating zones.

Yet another specific object of the invention is to provide a highly effective and novel cleaning apparatus which is especially well suited for use in a system and method having the foregoing features and advantages.

Certain of the foregoing and related objects are attained by the provision of the illustrated apparatus and system, and in particular by the provision of two steam-discharge zones in the apparatus. The spray means employed therefore comprises first and second, mutually independent steam-discharge structures, the second such structure being spaced from the first in the downstream direction of the workpiece travel path, and the supply means comprises first and second, mutually independent conduits joined, respectively, to the first and second discharge structures, each being adapted for connection to a steam supply source. The "first" conduit additionally has a port with associated means for introducing liquid water into the "first" conduit for admixture with steam flowing through it.

Other objects of the invention are attained by the provision of a method for cleaning a workpiece utilizing a spray of wet, relatively low-temperature (e.g., 120° C. to 200° C.) steam, and a spray of dry, relatively high-temperature (e.g., 340° C. to 425° C.) steam. Generally, the method will include subsequent steps of electrostatic deposition and integration (e.g., by fusion) of a particulate resinous coating material, and it is especially desirably applied for the cleaning and coating of work-pieces having portions of laminated metal construction, such as armatures for electrical machines.

DETAILED DESCRIPTION OF THE ILLUSTRATED EMBODIMENTS

Figure 1:
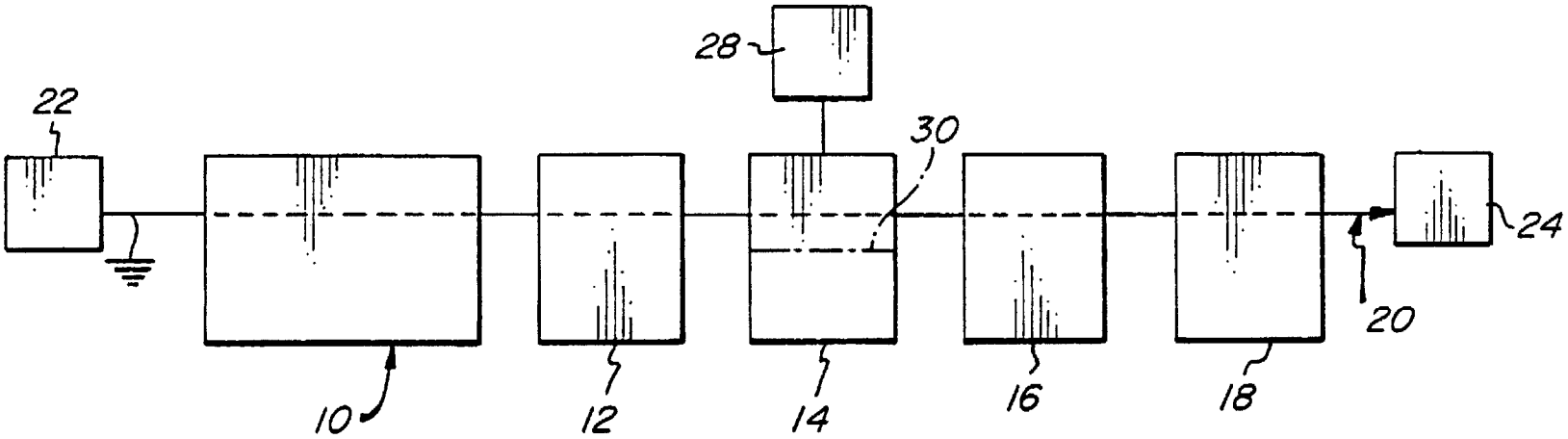
FIG. 1 is a schematic representation of a cleaning and coating system embodying the present invention.

Turning initially to FIG. 1 of the appended drawings, therein illustrated schematically is a cleaning and coating system embodying the present invention. It includes a degreasing unit, generally designated by the numeral 10, followed sequentially by a cooling unit 12, an electrostatic fluidized bed coating unit 14, a heating unit 16, and a second cooling unit 18. An electrically grounded conveyor mechanism, generally designated by the numeral 20 and having loading and unloading stations 22, 24 at its opposite ends, passes on a single level horizontally through each of the units 10, 12, 14, 16, and 18, to transport individual parts in the direction illustrated by the arrow in FIG. 1. A powder supply arrangement 28 is operatively connected to the coating unit 14, in which is disposed a porous support member 30, as is conventional.

Figure 2:
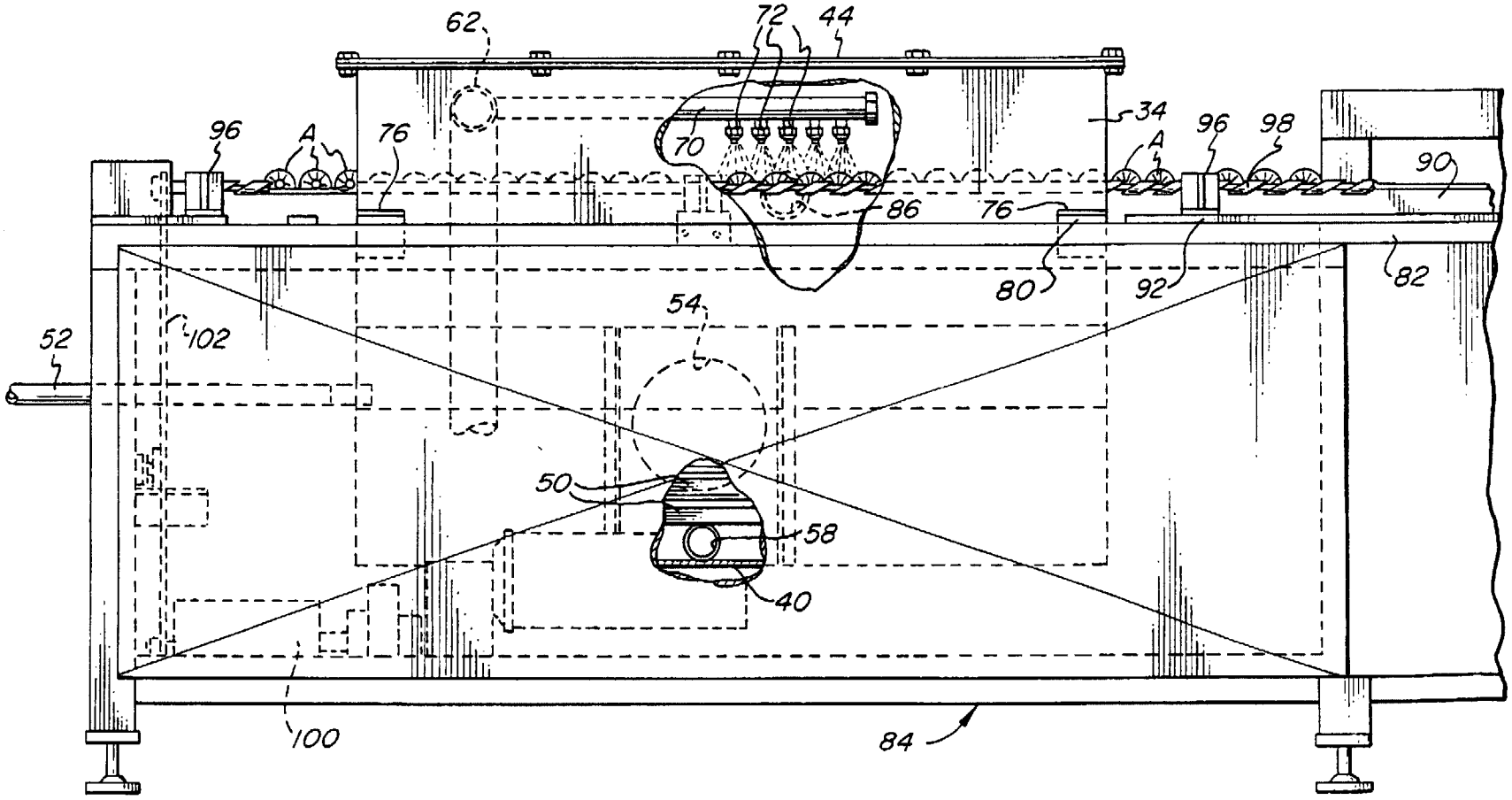
FIG. 2 is a fragmentary front elevational view of cleaning apparatus that is, as modified in accordance with FIGS. 5 through 7 hereof, suitable for use in the system of the invention, housing portions being broken away to expose internal features.
Figure 3:
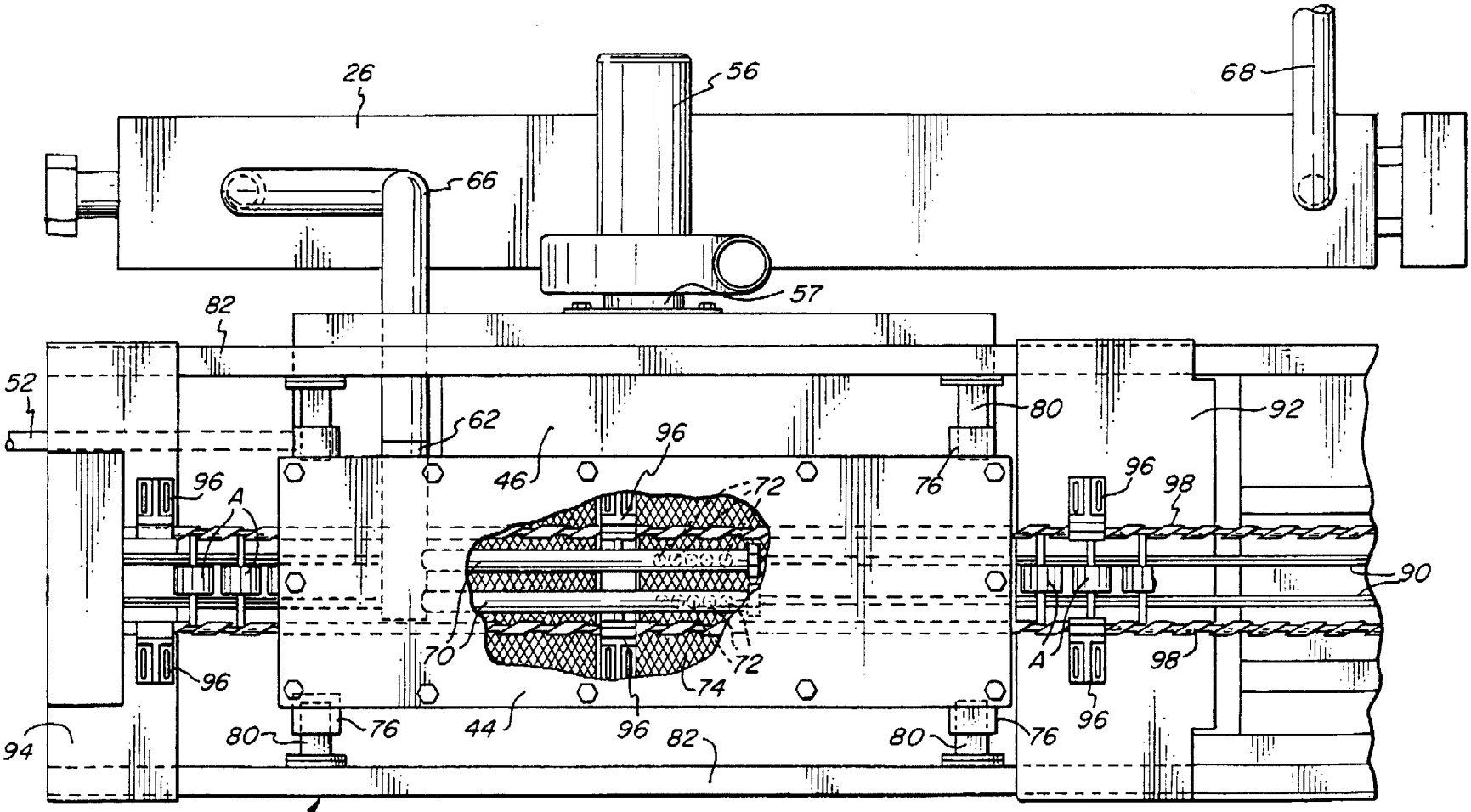
FIG. 3 is a fragmentary plan view of the apparatus of FIG. 2, with a cover portion broken away to expose internal features.
Figure 4:
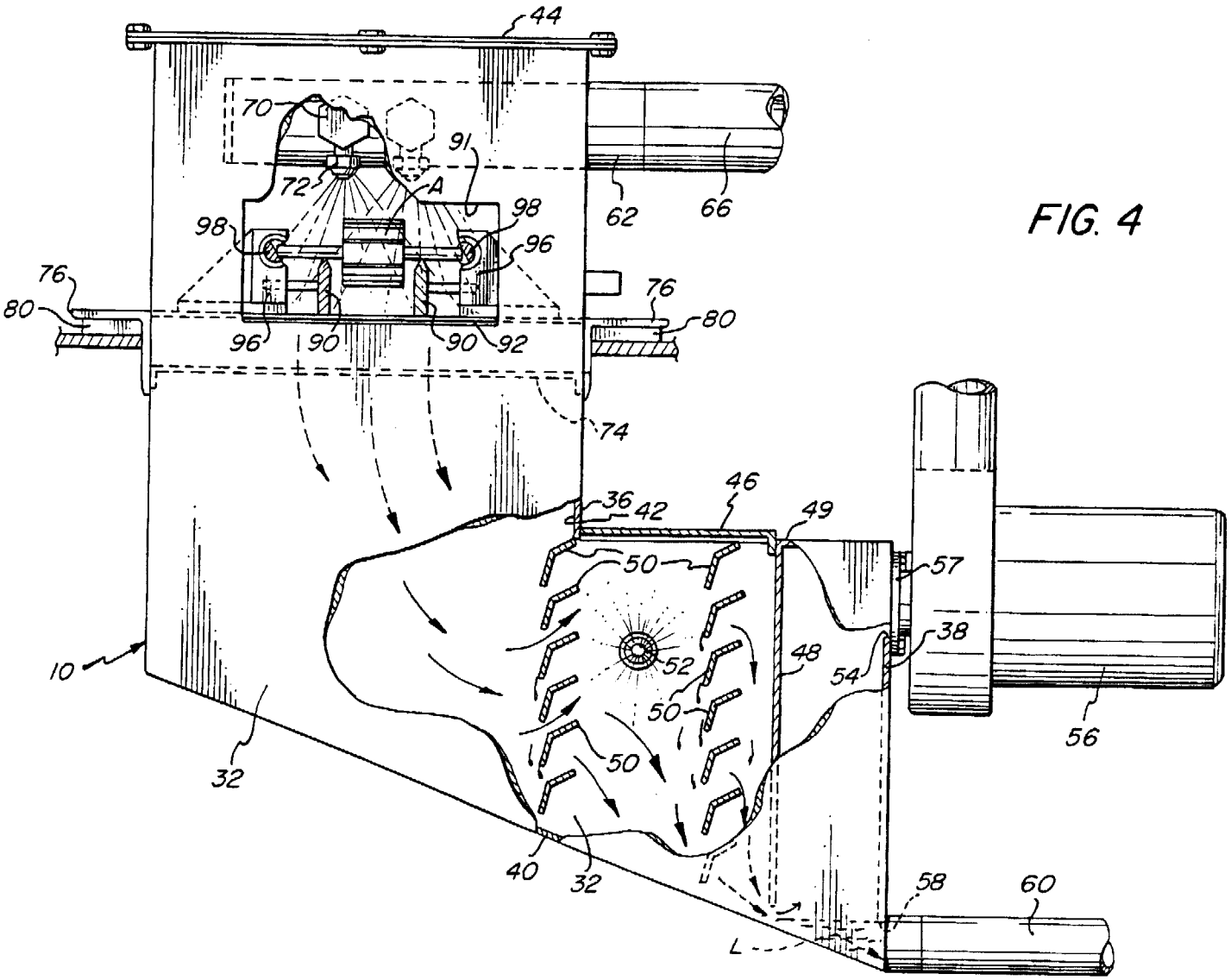
FIG. 4 is a fragmentary, right-end view of the apparatus of the foregoing Figures, drawn to a somewhat enlarged scale and again having portions broken away to show internal features.

With reference now to FIGS. 2–4, although the illustrated degreasing unit 10 includes only one steam discharge zone, these Figures are otherwise applicable to show features that may be employed in the apparatus and system of the invention. The unit 10 consists of a pair of generally L-shaped end walls 32, a front wall 34, upper and lower rear walls 36 and 38, respectively, and an inclined bottom wall 40. The several walls cooperatively define an internal chamber 42, which includes a forward cleaning compartment and a collecting compartment rearwardly offset therefrom at a level generally therebelow. The forward compartment is closed by a cover 44, which is bolted in place, and the top of the collecting compartment is closed by a plate 46 that is set into an opening in the overlying upper wall 49.

Disposed near the rear of the collecting compartment is a depending partition 48, which is attached to the overlying wall 49 and extends to a point short of the bottom wall 40. Elongated baffle elements 50, arranged in two transversely spaced columns, span the sidewalls 32 in front of the partition 48, and a spray tube 52 extends through one of the end walls 32 into the space therebetween, cooperatively creating a condenser section within the collecting compartment. It should be understood that such a condenser section is entirely optional, and constitutes no part of the present invention. A relatively large opening 54 is formed through the upper portion of the rear wall 38, to provide communication with an electric exhaust fan 56 mounted by flange assembly 57, and an outlet port 58 is formed at the lower end of the rear wall 38, adjacent the bottom wall 40, to communicate with the drain pipe 60.

Extending through the upper rear wall 36 is a steam manifold 62, which is connected to the superheater 26 by conduit 66; thus, the manifold 62 may serve for the delivery of dry, relatively high temperature steam, as monitored by a thermocouple (not shown). Inlet conduit 68 supplies saturated steam to the super heater 26, and two parallel pipes 70, each carrying a set of five downwardly directed nozzles 72, extend longitudinally within the chamber 42 from the manifold 62. Screen 74 spans the enclosure in a horizontal plane below the nozzles 72, and serves of course to prevent parts from dropping into the collecting compartment. A number of brackets 76 attached to the enclosure provide flange portions that extend forwardly and rearwardly from the walls 34 and 36, respectively, to support the unit 10 upon the upper beams 82 of the machine frame, generally designated by the numeral 84; heat-insulating pads 80 are interposed therebetween.

Two transversely spaced upstanding rails 90 extend parallel to one another along the top of the frame 84, passing through the aligned inlet and outlet openings 91 in the end walls 32 (only the outlet opening is visible). They rest upon the plates 92 and 94, which also support pairs of brackets 96, transversely aligned to opposite sides of the rails 90. The brackets 96 rotatably support parallel conveyor screws 98, which also extend through the openings 91 and cooperate with the rails to provide a length of the conveyor mechanism 20 depicted in FIG. 1, and an electric motor 100 is mounted within the lower portion of the from 84; the motor is operatively connected to the screws 98 through a belt 102, as well as to other mechanisms of the system (by means not shown). Panel 104 (and other similar panels, not shown) is suitably attached to enclose the illustrated section of the frame.

In operation, the objects to be cleaned and coated, depicted herein as armatures A, are initially loaded at station 22 onto the upstanding rails 90 with the opposite ends of their shafts engaged within the threads of the screws 98; they are grounded through the conveyor mechanism 20. The motor 100 serves of course to rotate the screws, causing them to carry the armatures forwardly through the enclosure of the cleaning unit 10, supported by the rails 90 and rotated by coaction therewith.

In the chamber 42 the armatures A will be subjected to high-pressure sprays of superheated steam, discharged from the nozzles 72. The steam will also heat the armatures to an elevated temperature, typically on the order of 370° C. Because the lubricants and other common liquid contaminants present normally exist in the gaseous state at temperatures of that order, the high-temperature steam will effect volatilization, expelling and flashing-off any such liquids that may be present between the lamina of the cores.

After exiting the degreasing enclosure, the cleaned armatures A will pass in sequence through the cooling, coating, heating and cooling units, 12, 14, 16, and 18, respectively. In the course of doing so they will be electrostatically coated in a conventional manner, ultimately being off-loaded at location 24. Thus, after the armatures are cooled as necessary to prevent premature fusion, they are exposed to a cloud of electrostatically charged particles, which are attracted thereto so as to form a coating, which is subsequently fused.

The contaminated steam from the upper portion of the forward chamber compartment will be drawn by exhaust fan 56 through the screen 74 and into the space between the columns of baffle elements 50. At that location a spray of water injected through the pipe 52 will effect condensation of any condensible fractions (e.g., of the steam, and of any contaminating substances) that may be present in the gaseous stream, with the resultant condensate liquid L passing under the internal partition 48, through the port 58, and into the drain pipe 60, to be discharged directly or conducted to a water treatment facility, as appropriate.

Not only does the present invention obviate problems associated with off-gassing of liquid contaminates subsequent to coating (e.g., pore formation, and electrical and physical discontinuities), but also the use of steam in the cleaning operation is highly beneficial from ecological and environmental standpoints. By avoiding any need for dipping of the workpiece into a solvent vapor tank, moreover, the process enables the use of a relatively simple conveyor system, operating horizontally and in a single plane.

Figure 5:
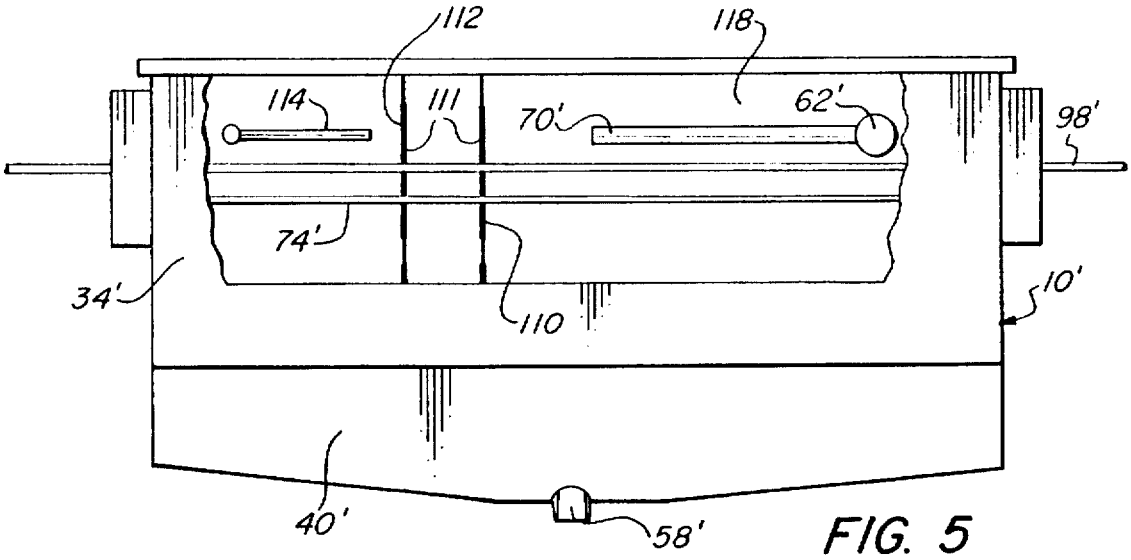
FIG. 5 is a diagrammatic, side elevational view of cleaning apparatus embodying the present invention, with portions broken away to show internal features.
Figure 6:
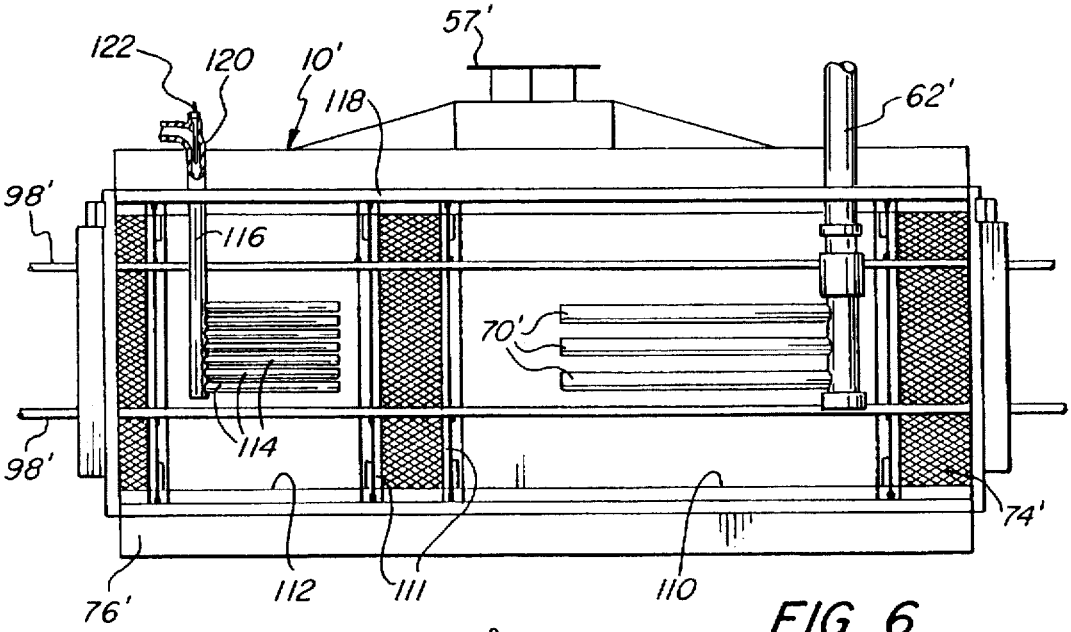
FIG. 6 is a diagrammatic, plan view of the apparatus of FIG. 5, with the cover removed to show internal features.
Figure 7:
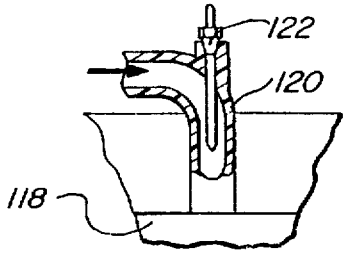
FIG. 7 is a fragmentary view, in partial section, showing a portion of the low-temperature steam delivery conduit proximate the enclosure of the apparatus, drawn to an enlarged scale.

Turning now in detail to FIGS. 5 through 7 of the drawings, therein illustrated is a degreasing unit 10' having two steam-cleaning zones, and thereby embodying the novel concepts of the invention. To the extent that the features shown correspond to those described in connection with FIGS. 1 through 4, common (but primed) numbers are employed. It will be appreciated that the unit 10' is employed in accordance herewith in lieu of the unit 10, and that is has associated with it, in the relationships described, the conveyor system and other components as will be evident to those skilled in the art; a condenser arrangement has not however been found necessary or beneficial in the present unit 10'.

The unit 10' includes a conduit 62' and three parallel pipes 70' (carrying downwardly directed nozzles, not shown), connected to superheated steam supply (also not shown) for discharge of high-temperature, dry steam into the compartment 110. A second compartment 112 is defined upstream of the compartment 110, in line therewith and separated by walls 111. It contains an assembly of seven parallel pipes 114 (also carrying downwardly directed nozzles, not shown) connected to a common manifold 116 which passes through the back wall 118 of the unit 10' and joins an elbow section 120 of a feed conduit, the latter being connected to a source (also not shown) of low-temperature steam. A water-injection nozzle 122 is installed in the elbow section 120, and is connected through a flow-control valve to a water supply (neither of which is shown), for the purpose of producing a suspension of water in steam. The resultant low-temperature, wet steam is used for prewashing of the workpieces as they are conveyed through the compartment 112. It will be appreciated that the proximity of the injection nozzle 122 to the enclosure of the unit 10', and its coaxial relationship to the portion of the manifold extending into the enclosure, are significant from the standpoint of ensuring that the steam discharged through the pipes 114 contains the desired concentration of water in liquid droplet form, and maintains its desired temperature.

Workpieces, such as the armatures A, are transported sequentially through both compartments 110, 112 of the unit 10' by a mechanism comprised of rails such as 90, and conveyor screws 98'. The wet, low-temperature steam discharged through the manifold and pipes 116, 114 will remove the bulk of oil and other contamination (including dirt and metal fragments) from the surface of the workpiece, and will begin the process of vaporization by heating them to a temperature substantially above ambient. In the second steam zone, constituted by the more downstream compartment 110, the surface-cleaning effect will be completed by the superheated dry steam discharged through the manifold and pipes 62', 70'. The bulk of the vaporization of substances from between the laminae of the armatures will also occur in this zone, from which the armatures will exit in a virtually dry condition, ideally prepared for electrostatic powder coating, as described.

In a typical installation, the superheated steam zone will be about twice the length of the prewashing zone, and about 288 liters per hour of steam at 370° C. will be discharged therein. About 72 liters per hour of steam at 175° C. will be discharged in the prewash zone, into which steam about 340 liters per hour of water will be sprayed through the injector.

Thus, it can be seen that the present invention provides a novel system, method and apparatus by and with which workpieces, and especially electrical components of laminated construction, can be cleaned and coated in a continuous, in-line operation so as to enable the production of high quality, porefree coatings thereupon. Metal-forming lubricants, and other substances that volatilize a elevated temperatures, will inherently be expelled from between adjacent lamina of a workpiece during the cleaning phases of operation, and the conveyor used for transporting the parts through the cleaning and coating zones can operate on a single level.

Having thus described the invention, what is claimed is:

1. Apparatus for cleaning a workpiece transported therethrough, comprising:

an enclosure defining a chamber with entrance and exit openings thereinto and therefrom, and defining a travel path section extending therethrough between said openings and demarcating a spray compartment within said chamber;

spray means, disposed within said spray compartment, for discharging steam upon a workpiece transported along said travel path section; and supply means operatively connected to said spray means for supplying steam thereto, said supply means comprising at least first and second, mutually independent steam-discharge structures, said second structure being spaced from said first structure in the downstream direction of said travel path *section*; and said supply means comprising at least first and second, mutually independent conduits connected, respectively, to said first and second discharge structures, each being adapted for connection to a separate steam supply source, said first conduit additionally having a port with associated means for introducing liquid water into said first conduit for admixture with steam flowing therethrough.

2. The apparatus of claim 1 wherein said port and associated means of said first conduit are disposed proximate said first discharge structure.

3. The apparatus of claim 2 wherein said first conduit has a flow axis, and said associated means injects water coaxially therewith.

4. The apparatus of claim 1 wherein said travel path section demarcates said spray compartment thereabove and a collection compartment therebelow, and wherein said apparatus includes means for withdrawing liquids collected in said collection compartment.

5. A system for cleaning and coating a workpiece, comprising:

a. apparatus for cleaning, said apparatus comprising an enclosure defining a chamber with entrance and exit openings thereinto and therefrom, and defining a travel path section extending therethrough between said openings and demarcating a spray compartment within said chamber;

spray means, disposed within said spray compartment, for discharging steam upon a workpiece transported along said travel path section; and supply means operatively connected to said spray means for supplying steam thereto, said supply means comprising at least first and second, mutually independent steam discharge structures, said second structure being spaced from said first structure in the downstream direction of said travel path *section*; and said supply means comprising at least first and second, mutually independent conduits connected, respectively, to said first and second discharge structures, each being adapted for connection to a separate steam supply source, said first conduit additionally having a port with associated means for introducing liquid water into said first conduit for admixture with steam flowing therethrough;

b. coating means for producing a cloud of electrostatically charged solid particles;

c. means for transporting a workpiece along a travel path having a first section extending through said chamber and between said openings of said enclosure, and having a second section, downstream of said first section, extending proximate said coating means to enable exposure of the transported workpiece to said cloud for deposition of said particles thereupon; and d. means for effecting fusion of the particulate deposit produced by said coating means upon the workpiece.

6. The system of claim 5 wherein said coating means comprises an electrostatic fluidized bed unit, and wherein said means for effecting fusion comprises a heating unit, said fluidized bed unit having a porous plate defining a plenum therebelow and a coating chamber thereabove, said second portion of said travel path extending through said coating chamber.

7. The system of claim 6 wherein said means for transporting comprises a conveyor extending along said travel path and having spaced members adapted to rotatably and drivingly engage the ends of oppositely extending shaft portions of a transported workpiece; wherein said travel path lies substantially entirely in a horizontal plane; and wherein said spray means comprises a plurality of nozzles arranged in a bank extending along said first travel path section between and above said spaced members of said conveyor, said system thereby being adapted for the cleaning and coating of armatures having a cylindrical core with shaft portions extending axially from the opposite ends thereof.

8. The system of claim 6 additionally including cooling means disposed along said travel path between said cleaning apparatus and said fluidized bed unit, said cooling means being operative to lower the temperature of the transported workpiece.

9. A method for cleaning a workpiece contaminated with a volatilizable liquid, comprising the steps:

a. transporting a workpiece contaminated with a volatilizable liquid along a travel path, and carrying out the following steps during said transporting:

b. discharging wet steam upon said workpiece so as to substantially remove said liquid therefrom and elevate the temperature of said workpiece; and c. discharging dry steam, having a temperature higher than said wet steam, upon said workpiece so as to further elevate the temperature thereof, said workpiece including a portion that is of laminated metal construction, and said liquid residing at least partially between the lamina thereof, said liquid comprising a substance that exists in the gaseous state at the temperature to which said workpiece is elevated in said step c., at least said dry steam thereby being effective to volatilize and expel said liquid from between the lamina.

10. The method of claim 9 wherein said wet steam has a temperature in the range of about 120° C. to 200° C., and wherein said dry steam has a temperature in the range of about 340° C. to 425° C.

11. A method for cleaning and coating a workpiece contaminated with a volatilizable liquid, comprising the steps:

a. transporting a workpiece contaminated with a volatilizable liquid along a travel path, and carrying out the following steps during said transporting;

b. discharging wet steam upon said workpiece so as to substantially remove said liquid therefrom and elevate the temperature of said workpiece;

c. discharging dry steam, having a temperature higher than said wet steam, upon said workpiece so as to further elevate the temperature thereof;

d. exposing said workpiece to a cloud of electrostatically charged particles with said workpiece at an electrical potential effective to attract particles of said cloud thereto, to form a coating thereupon;

e. cooling said workpiece between said steps c. and d., as necessary to prevent fusion of said particles of said coating during said step d; and f. effecting fusion of said particles of said coating on said workpiece subsequent to said step d.

12. The method of claim 11 wherein said workpiece includes a portion that is of laminated metal construction, and wherein said liquid resides at least partially between the lamina thereof, said liquid comprising a substance that exists in the gaseous state at the temperature to which said workpiece is elevated in said step c., at least said dry steam thereby being effective to volatilize and expel said liquid from between the lamina.

13. The method of claim 12 wherein said workpiece is the armature of an electrical machine, said armature having a cylindrical core, which provides said workpiece portion, and having shaft portions extending from the opposite ends of said core.

14. The method of claim 12 wherein said particles are of a thermoplastic material, and said step f. is effected by heating of said workpiece.

15. The method of claim 11 wherein said travel path lies substantially entirely on a single horizontal plane.

16. The method of claim 11 wherein said wet steam has a temperature in the range of about 120° C. to 200° C., and wherein said dry steam has a temperature in the range of about 340° C. to 425° C.

*17. Apparatus for cleaning a workpiece transported therethrough, comprising:*

*an enclosure defining a chamber with entrance and exit openings thereinto and therefrom, and defining a travel path section extending therethrough between said openings, said travel path section demarcating, within said chamber, a spray compartment thereabove and a collection compartment therebelow;*

*spray means, disposed within said spray compartment, for discharging steam upon a workpiece transported along said travel path section;*

*supply means operatively connected to said spray means for supplying steam thereto, said supply means comprising at least first and second, mutually independent steam-discharge structures, said second structure being spaced from said first structure in the downstream direction of said travel path section; said first steam discharge structure discharging steam having a first temperature and said second steam discharge structure discharging steam having a second temperature higher than said first temperature; and*

*suction means for drawing air and steam from said collection compartment, and thereby for drawing ambient air through said chamber openings and steam from said spray compartment.*

*18. The apparatus of claim 17 additionally including condenser means in said collection compartment, and drain means for withdrawing liquids condensed in said collection compartment.*

*19. The apparatus of claim 17 wherein said supply means comprises means for providing steam having said first temperature, operatively connected to said first steam-discharge structure, and means for providing steam having said second temperature, operatively connected to said second steam-discharge structure.*

*20. A system for cleaning and coating a workpiece, comprising:*

*a. apparatus for cleaning, said apparatus comprising an enclosure defining a chamber with entrance and exit openings thereinto and therefrom, and defining a travel path section extending therethrough between said openings, said travel path section demarcating, within said chamber, a spray compartment thereabove and a collection compartment therebelow;*

*spray means, disposed within said spray compartment, for discharging steam upon a workpiece transported along said travel path section;*

*supply means operatively connected to said spray means for supplying steam thereto, said supply means comprising at least first and second, mutually independent steam-discharge structures, said second structure being spaced from said first structure in the downstream direction of said travel path section; said first steam discharge structure discharging steam having a first temperature and said second steam discharge structure discharging steam having a second temperature higher than said first temperature; and*

*suction means for drawing air and steam from said collection compartment, and thereby for drawing ambient air through said chamber openings and steam from said spray compartment;*

*b. coating means for producing a cloud of electrostatically charged solid particles;*

*c. means for transporting a workpiece along a travel path having a first section extending through said chamber and between said openings of said enclosure, and having a second section downstream of said first section, extending proximate said coating means to enable exposure of the transported workpiece to said cloud for deposition of said particles as a particulate deposit thereupon; and*

*d. means for effecting fusion of the particulate deposit produced by said coating means upon the workpiece.*

*21. The system of claim 20 wherein said apparatus additionally includes condenser means in said collection compartment, and drain means for withdrawing liquids condensed in said collection compartment.*

*22. The system of claim 20 wherein said supply means of said apparatus comprises means for providing steam having said first temperature, operatively connected to said first steam-discharge structure, and means for providing steam having said second temperature, operatively connected to said steam-discharge structure.*

*23. A method for cleaning a workpiece, comprising the steps:*

*a. providing apparatus for cleaning, said apparatus comprising an enclosure defining a chamber with entrance and exit openings thereinto and therefrom, and defining a travel path section extending therethrough between said openings, said travel path section demarcating, within said chamber, a spray compartment thereabove and a collection compartment therebelow;*

*spray means, disposed within said spray compartment, for discharging steam upon a workpiece transported along said travel path section;*

*supply means operatively connected to said spray means for supplying steam thereto, said supply means comprising at least first and second, mutually independent steam-discharge structures, said second structure being spaced from said first structure in the downstream direction of said travel path section; and said supply means comprising means for providing steam having a first temperature, operatively connected to said first steam-discharge structure, and means for providing steam having a second temperature higher than said first temperature, operatively connected to said second steam-discharge structure; and*

*suction means for drawing air and steam from said collection compartment, and thereby for drawing ambient air through said chamber openings and steam from spray compartment;*

*b. transporting a contaminated workpiece along said travel path section, and carrying out the following steps during said transporting;*

*c. discharging steam at said first temperature upon said workpiece so as to elevate the temperature of said workpiece;*

*d. thereafter discharging steam at said second temperature upon said workpiece so as to further elevate the temperature thereof; and*

*e. operating said suction means, while carrying out said steps b., c., and d., so as to draw air and steam from said collection compartment, and thereby to draw ambient air through said chamber openings and steam from said spray compartment.*

*24. The method of claim 23 wherein said apparatus additionally includes condenser means in said collection compartment, and also drain means for withdrawing liquids condensed in said collection compartment, said method including the further steps of condensing liquid water from said steam in said collection compartment, and of withdrawing water from said collection compartment.*

* * * * *